United States Patent
Royse

(10) Patent No.: US 6,945,509 B2
(45) Date of Patent: Sep. 20, 2005

(54) UNIVERSAL VALVE SWITCH

(75) Inventor: David L. Royse, Wildwood, MO (US)

(73) Assignee: Potter Electric Signal Company, St. Louis, MO (US)

( * ) Notice: Subject to any disclaimer, the term of this patent is extended or adjusted under 35 U.S.C. 154(b) by 28 days.

(21) Appl. No.: 10/352,429

(22) Filed: Jan. 28, 2003

(65) Prior Publication Data

US 2004/0144942 A1 Jul. 29, 2004

(51) Int. Cl.⁷ .................................................. F16K 51/00
(52) U.S. Cl. ..................... 251/129.04; 169/23; 239/73; 200/61.86
(58) Field of Search ................. 251/129.04; 200/61.86; 169/23; 239/73

(56) References Cited

U.S. PATENT DOCUMENTS

| | | | | |
|---|---|---|---|---|
| 782,531 A | * | 2/1905 | Thompson | 169/23 |
| 1,762,066 A | * | 6/1930 | Mackey | 200/61.86 |
| 1,792,245 A | | 2/1931 | Robinson | |
| 2,176,794 A | * | 10/1939 | Greene | 200/61.86 |
| 2,631,393 A | * | 3/1953 | Hetherington | 200/61.86 |
| 2,748,229 A | | 5/1956 | Block | 200/169 |
| 2,824,197 A | | 2/1958 | Bolek | 200/172 |
| 3,700,002 A | * | 10/1972 | Christie | 200/61.86 |
| 3,715,545 A | | 2/1973 | Long | 200/159 |
| 3,750,430 A | * | 8/1973 | Crisa | 200/61.86 |
| 3,787,653 A | | 1/1974 | Maher | 200/153 |
| 3,896,280 A | | 7/1975 | Blake | 200/81.9 |
| 4,002,872 A | | 1/1977 | Desio | 200/294 |
| 4,063,056 A | | 12/1977 | Baker | 200/332 |
| 4,123,633 A | * | 10/1978 | Stevens et al. | 200/61.86 |
| 4,154,189 A | * | 5/1979 | Gallagher et al. | 169/23 |
| 4,226,258 A | | 10/1980 | Nakanishi | 137/208 |
| 4,239,947 A | | 12/1980 | Breitung et al. | 200/61.89 |
| 4,242,082 A | | 12/1980 | Branson et al. | 431/72 |
| 4,251,698 A | * | 2/1981 | Raab et al. | 200/61.86 |
| 4,326,627 A | | 4/1982 | Massey et al. | 200/47 |
| 4,356,625 A | | 11/1982 | Demi | 29/622 |
| 4,400,602 A | | 8/1983 | Kuromitsu et al. | 200/82 |
| 4,518,008 A | | 5/1985 | Fenster et al. | 137/552 |
| 4,739,134 A | | 4/1988 | Hopmann et al. | 200/61.86 |
| 4,971,109 A | | 11/1990 | McHugh | 137/559 |
| 4,993,453 A | | 2/1991 | McHugh | 137/559 |
| 5,103,862 A | | 4/1992 | McHugh | 137/559 |
| 5,144,102 A | | 9/1992 | Buse | 200/83 |
| 5,269,344 A | | 12/1993 | McHugh | 137/557 |
| 5,277,223 A | | 1/1994 | Glockner et al. | 137/554 |
| 5,360,172 A | | 11/1994 | Wang | 239/586 |
| 5,406,979 A | | 4/1995 | McHugh | 137/557 |
| 5,522,420 A | | 6/1996 | Martin | 137/343 |
| 5,613,516 A | | 3/1997 | Landrum | 137/509 |
| 5,771,926 A | | 6/1998 | Medal et al. | 137/554 |
| 6,398,084 B2 | * | 6/2002 | Maruyama et al. | 222/504 |

* cited by examiner

Primary Examiner—John Bastianelli
(74) Attorney, Agent, or Firm—Ari M. Bai; Greensfelder, Hemker & Gale, P.C.

(57) ABSTRACT

A universal valve switch for signaling the operative state of a valve assembly is disclosed that is attached to the body of the valve assembly using a bracketing arrangement. The valve switch comprises a housing defining a chamber and an aperture formed through the housing that communicates with the chamber. The valve switch may include a contact arrangement having a spring-loaded plunger that is extendable through the aperture with the plunger being operatively associated with the contact arrangement for selectively transmitting a signal to a remote panel whenever the lever is rotated out of contact with the plunger. In other embodiments, the contact arrangement may be replaced with various types of sensor assembly.

21 Claims, 6 Drawing Sheets

UNIVERSAL VALVE SWITCH

BACKGROUND OF THE INVENTION

1. Field of the Invention

The present invention relates to switches, and particularly to a valve switch for a fire suppression system. More specifically, the present invention relates to a valve switch universally fitted to an existing valve assembly.

2. Prior Art

Sprinkler systems for suppressing fires and initiating a fire alarm are well known in the prior art. As shown in FIG. 1, prior art sprinkler systems commonly include a valve assembly 12 interposed along a conduit 18 located between a water supply and the sprinkler system. The valve assembly 12 includes a valve body 14 and a valve member (not shown) which is used to close off the flow of water through assembly 12 using a rotatable lever 16 in order to test and perform maintenance on the sprinkler system. In some cases, particularly with large valve arrangements, the valve assembly 12 includes an integral valve switch 13 which transmits a signal to a remote panel (not shown) whenever the valve member is placed in the closed position. Over the course of time the valve switch 13 may fail which requires maintenance personnel to replace the entire existing valve assembly in order to replace the failed valve switch because the prior art valve switch 13 is an integral component of the valve assembly 13. Accordingly, maintenance personnel must take the extra time to replace the entire valve assembly which is a time consuming and wasteful procedure.

Therefore, there is a need in the art for a valve switch which may be easily universally fitted to an existing valve assembly for a fire suppression system. There is a further need in the art for a valve switch that does not require direct integration of the valve switch to an existing valve assembly.

OBJECTS AND SUMMARY OF THE INVENTION

The primary object of the present invention is to provide a valve switch which may be universally fitted to an existing valve or new assembly.

Another object of the present invention is to provide a valve switch that does not require direct structural integration of the valve switch to an existing valve assembly.

Yet another object of the present invention is to provide a valve switch that may be universally fitted to many different types of valve assemblies.

A further object of the present invention is to provide a valve switch which transmits a signal to a remote site whenever the lever of the valve assembly is placed out of contact with the valve switch.

Another further object of the present invention is to provide a valve switch that may require maintenance personnel to manually or automatically re-set the valve switch after performing maintenance.

Yet another further object of the present invention is to provide a valve switch having a tamper switch arrangement that is activated whenever the cover of the valve switch is opened.

In brief summary, the present invention overcomes and substantially alleviates the deficiencies present in the art by providing a universal valve switch for a fire suppression system.

In the preferred embodiment, the valve switch comprises a casing having a main housing that defines a chamber therein which houses a switch arrangement and a cover rotatably engaged to the main housing for enclosing the switch arrangement. The switch arrangement includes a spring-loaded plunger having a frustoconical section with an extension having a double beveled distal tip that is axially extendable through an aperture formed through the main housing. The plunger is operable between an extended position and a raised position by the user. In the extended position, the extension of the plunger extends outwardly through the aperture a short distance from the main housing, while in the raised position the user may force the plunger upward such that the double beveled distal tip of the extension is made flush with the aperture. The switch arrangement further includes a terminal assembly having a switch element that activates a contact arrangement when the plunger is placed in the extended position by the user. In this position, the contact arrangement changes state and a signal is transmitted to a remote panel. A tamper switch is also provided that transmits a signal whenever the cover of the valve switch is opened.

In an alternate embodiment, the plunger has a flat distal tip rather than a beveled one with a pair of grooves formed around a middle portion of the plunger that is engageable with a pivotable stop actuator. A stop actuator operates to lock the plunger in the extended position when pivoted to one side as the stop actuator engages one of the grooves, while releasing the plunger when the stop actuator is pivoted to the other side.

In further alternate embodiments, the plunger may have a single-beveled distal tip or a conical one for operative contact with the lever.

In assembly, the valve switch of the present invention is universally fitted to an existing valve assembly through a bracket arrangement that secures the valve switch to the valve assembly without having to structurally integrate the valve switch directly to the body of the valve assembly. Once the valve switch is properly secured, the user places the plunger in the raised position until the tip of the extension is flush with the aperture. Preferably, the user then rotates the lever of the valve assembly to a position so that it is placed directly underneath and supports the extension. In this orientation, the lever maintains the plunger in the raised position and the contact arrangement changes state, thereby terminating the signal to the remote panel.

When the user performs maintenance on the fire suppression system, the lever is rotated out of contact with the plunger. As the user rotates the lever, the plunger is simultaneously forced to the extended position which causes the contact arrangement of the valve switch to change state and transmit a signal to a remote panel. After maintenance has been completed, the user may rotate the lever to a position which causes the plunger to be placed in the raised position. In the raised position, the contact arrangement changes state which terminates the signal to the remote panel. One aspect of the present invention is that the rotatable lever operates to cause the change in state in the contact arrangement in conjunction with the spring-loaded plunger.

In an alternative embodiment, the contact arrangement is responsive to a magnetic sensor assembly comprising a magnet and a reed switch or a Hall Effect Sensor which senses whether the plunger is in close proximity with the sensor assembly.

In another alternative embodiment, the contact arrangement is responsive to an optical assembly comprising a photocell and lightsource with the lever interposed between the photocell and the light source.

In yet another embodiment, the contact arrangement is responsive to a proximity sensor which senses the presence of the lever when it is rotated in close proximity with the sensor.

These and other objects of the present invention are realized in the preferred embodiment, described by way of example and not by way of limitation, which provides for a universal valve switch for a fire suppression system.

Additional objects, advantages and novel features of the invention will be set forth in the description which follows, and will become apparent to those skilled in the art upon examination of the following more detailed description and drawings in which like elements of the invention are similarly numbered throughout.

DETAILED DESCRIPTION OF THE INVENTION

Figure 1:
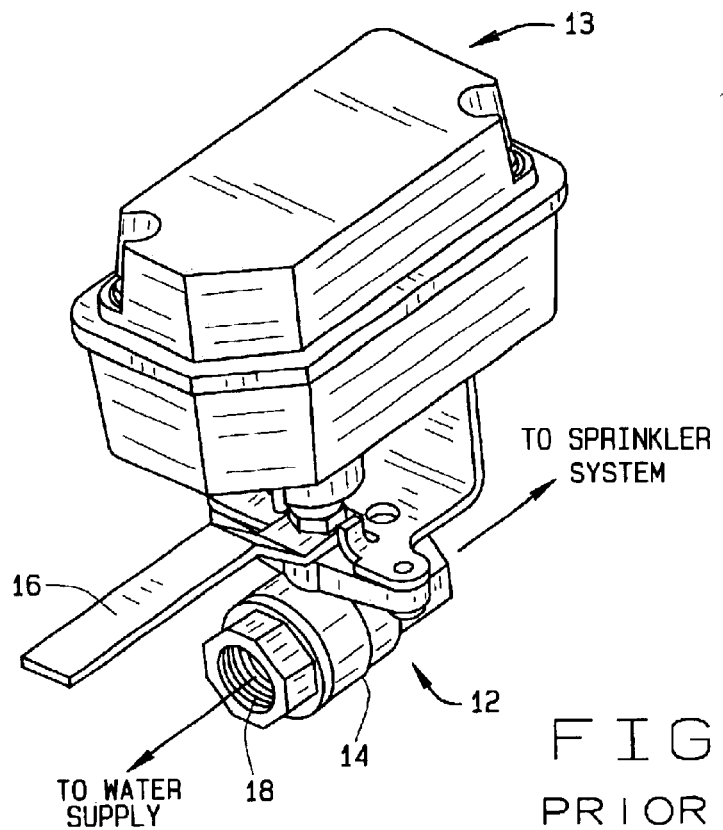
FIG. 1 is a perspective view of a prior art valve switch structurally integrated into an existing valve assembly.
Figure 2:
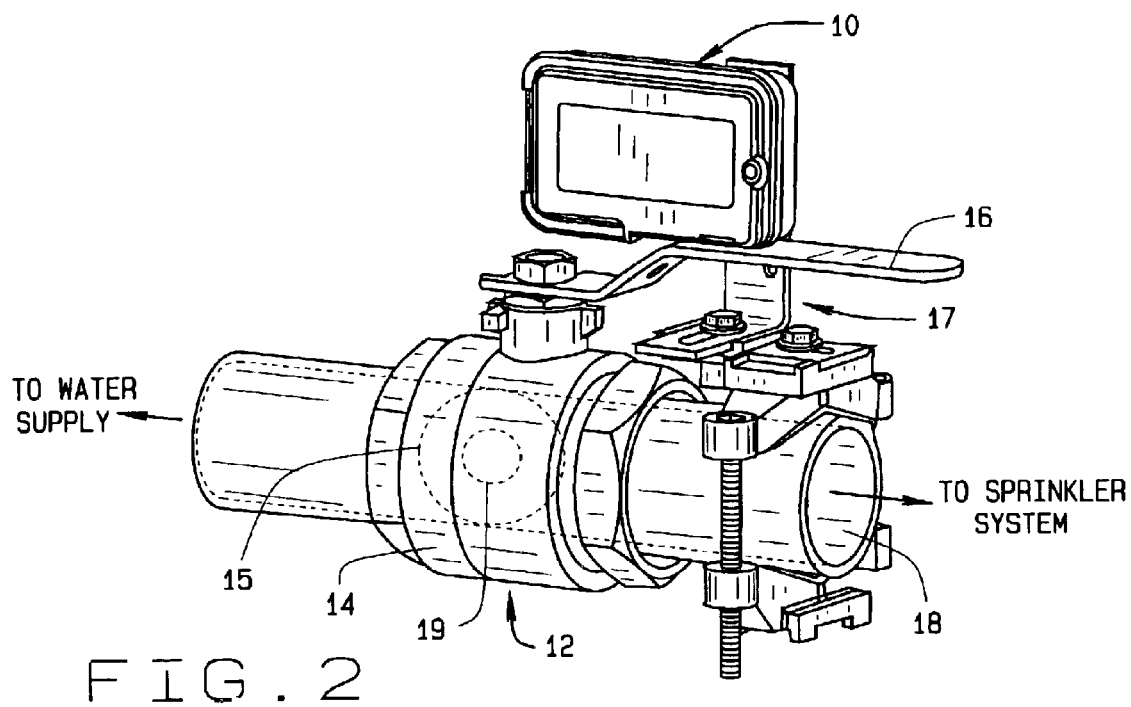
FIG. 2 is a perspective view of a universal valve switch attached to an existing valve assembly according to the present invention.

Referring to the drawings, the preferred embodiment of the universal valve switch used with an existing or new valve assembly 12 is illustrated and generally indicated as 10 in FIG. 2. Valve assembly 12 comprises a valve body 14 defining a conduit 18 (not shown) therethrough for fluid flow communication between a fluid source and a sprinkler system (not shown). A valve member 15 (shown in phantom) having an opening 19 is disposed across is conduit 18 and operatively connected to a rotatable lever 16 that is operable between an open, closed and intermediate positions. In the closed position, valve member 15 is positioned such that valve body 14 blocks fluid flow communication through conduit 18, while in the open position, valve member 15 is oriented such that opening 19 is oriented to permit fluid flow communication through conduit 18. In the intermediate position, lever 16 places valve member 15 in a position where limited fluid flow is permitted through conduit 18.

When properly assembled, valve switch 10 is securely attached to valve assembly 12 by a conventional bracket arrangement 17 which can accommodate different sizes and shapes of valve assembly 12. Another advantage of bracket arrangement 17 is that the valve switch 10 may be securely attached to the valve assembly 12 without having to structurally integrate the valve switch 10 directly to the valve body 14. Instead, the bracket arrangement 17 preferably secures to the valve switch 10 using suitable brackets that are tightened around the valve assembly 12 or conduit 18 by screws (not shown).

Figure 3:
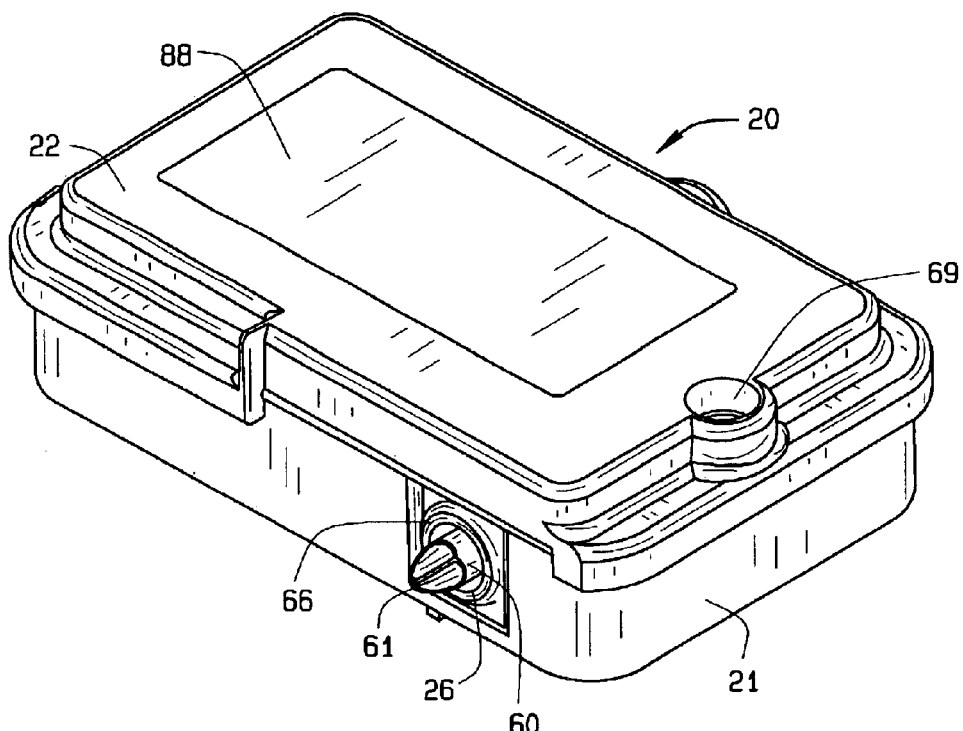
FIG. 3 is a perspective view of the main housing of a preferred embodiment of the universal valve switch according to the present invention.
Figure 4B:
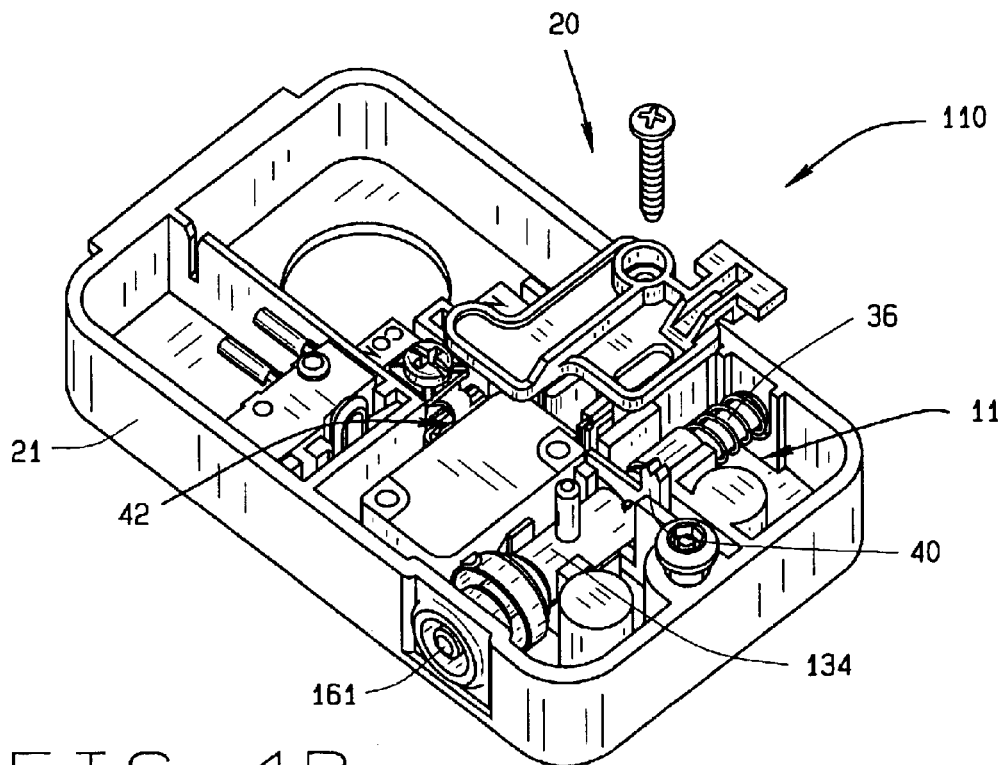
FIG. 4b is a partially exploded perspective view of the main housing of an alternative embodiment of the universal valve switch showing the plunger with a flat distal tip in the raised position according to the present invention.
Figure 4A:
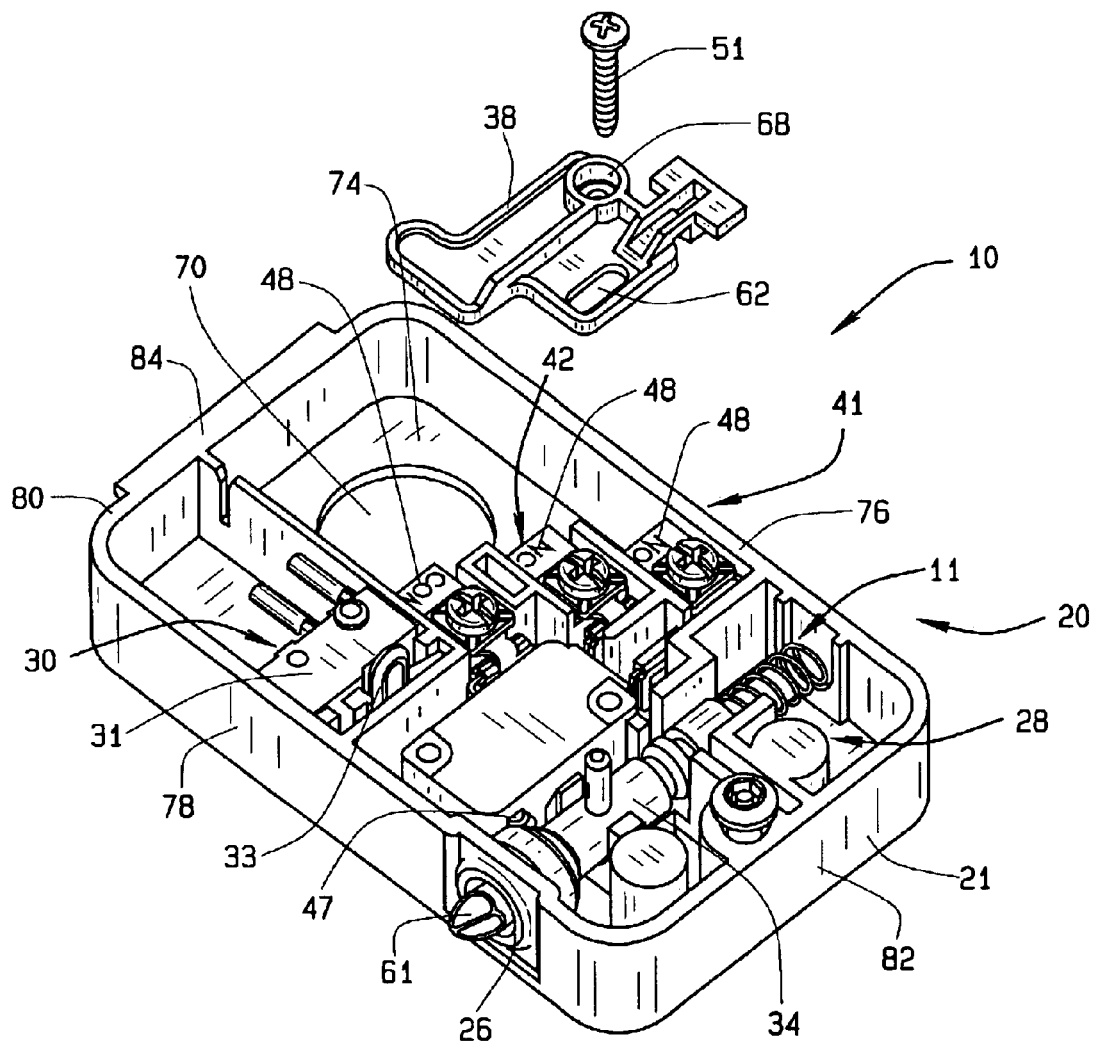
FIG. 4a is a partially exploded perspective view of the main housing of the preferred embodiment of the universal valve switch showing the plunger in the extended position according to the present invention.

Referring to FIGS. 3 and 4a, the preferred embodiment of present invention includes a casing 20 having a main housing 21 which is sized and shaped to receive a switch arrangement 11 therein. Main housing 21 comprises a back wall 74, top and bottom walls 76 and 78, and opposing side walls 80 and 82 which collectively define a chamber 28. As further shown, an aperture 26 is formed through bottom wall 78 for receiving a portion of the switch arrangement 11 therethrough while back wall 74 defines a circular opening 70 adapted to engage an elbow (not shown) for receiving wires which operatively connect valve switch 10 with a remote panel and a power source (not shown). To prevent tampering or damage to the switch arrangement 11, a cover 22 is provided having a slot portion (not shown) formed along one end thereof that is rotatably secured to a hinge portion 84 integrally formed on main housing 21. A gasket cover 43 (FIG. 5) is also provided that establishes a fluid tight seal between the cover 22 and main housing 21.

Figure 5:
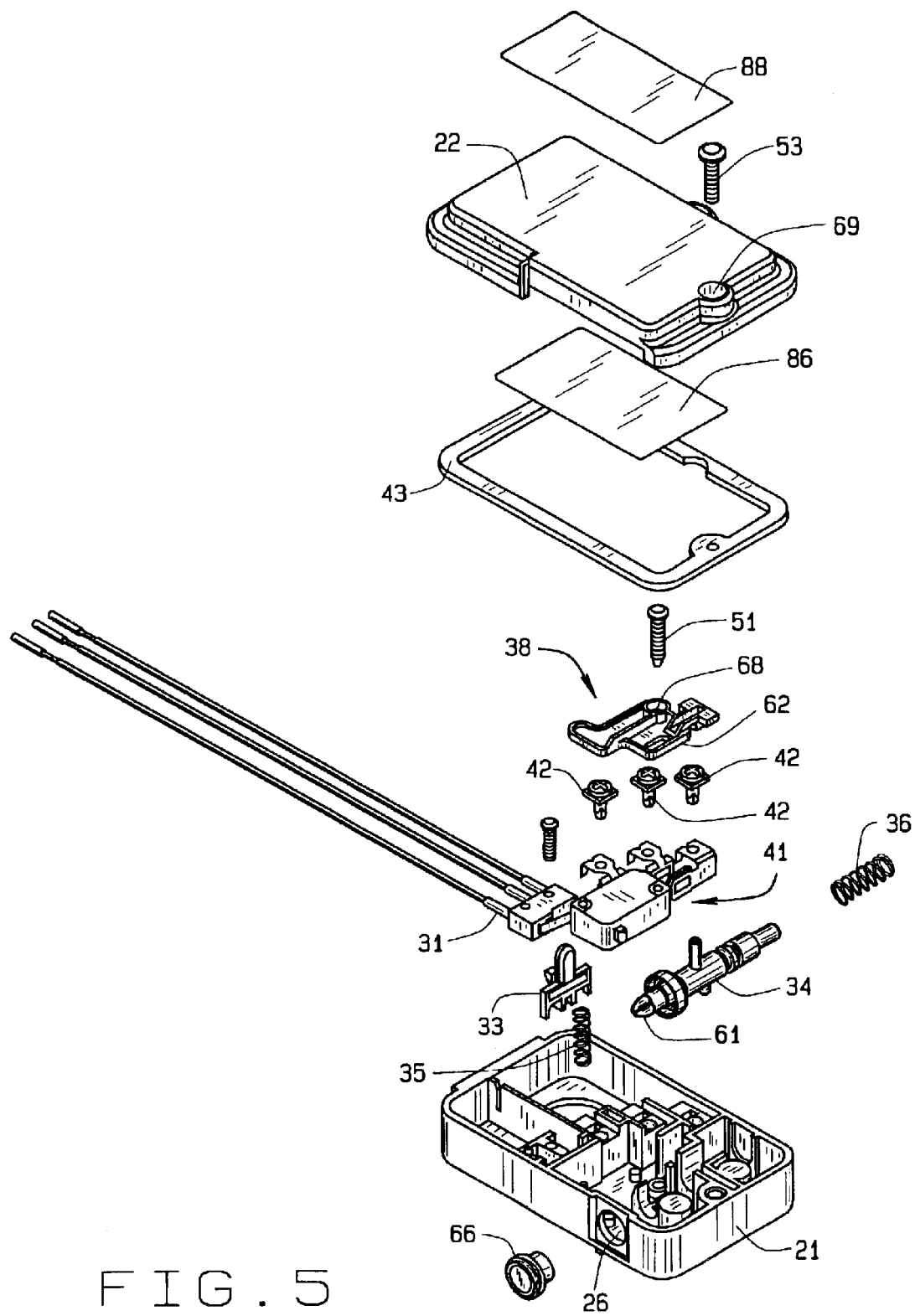
FIG. 5 is an exploded view of the preferred embodiment of the universal valve switch according to the present invention.

Referring to FIGS. 4a and 5, the switch arrangement 11 of the present invention may transmit a signal to the remote panel whenever lever 16 is placed out of contact with valve switch 10 as shall be discussed in greater detail below. Switch arrangement 11 comprises a spring-loaded plunger 34 that is operable between a raised position and an extended position. In the extended position, plunger 34 activates a terminal assembly 41 having a contact arrangement 42 which changes state and causes a signal to be transmitted to a remote panel (not shown), while in the raised position plunger 34 deactivates terminal assembly 41 and causes contact arrangement 42 to change state again and terminate the signal.

Figure 6A:
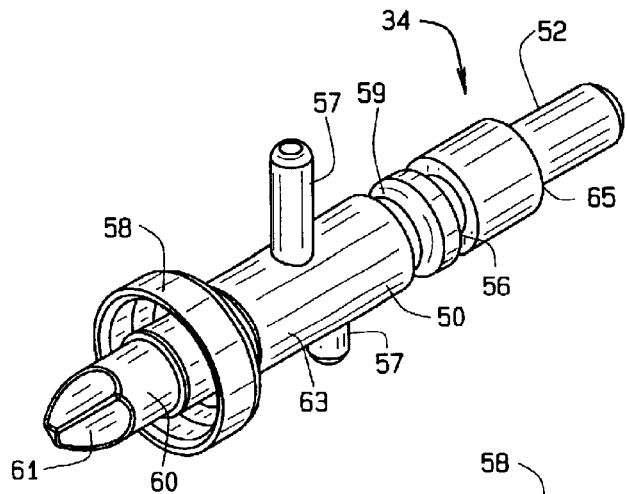
FIG. 6a is a perspective view of the preferred embodiment of the plunger showing a double-beveled distal tip according to the present invention.

Referring to FIG. 6a, plunger 34 of switch arrangement 11 shall be discussed in greater detail. Plunger 34 comprises a tubular body So having a small diameter section 52 defined at one end and an axial extension 60, preferably having a double beveled distal tip 61, formed at the other end thereof. The double beveled distal tip 61 facilitates easier engagement of lever 16 under tip 61 as lever 16 is placed in contact with plunger 34 when plunger 34 is placed in the raised position. Plunger 34 further includes a middle section 63 formed between the small diameter section 52 and extension 60. Middle section 63 defines upper and lower grooves 56 and 59. As shown, small diameter section 52 defines a shoulder 65 at its juncture with middle section 63. To bias plunger 34 between the raised and extended positions, a spring 36 (FIG. 5) is sized and shaped to engage small diameter section 52 such that spring 36 abuts against shoulder 65. When plunger 34 is placed in the raised position, spring 36 becomes compressed between shoulder 65 and top wall 76 and an axial downward spring force is applied against plunger 34. Opposing handles 57 are provided on plunger 34 which extend outwardly from middle section 63 and allow a user to grasp and actuate plunger 34 between the raised and extended positions as shall be discussed in greater detail below. Middle section 63 further includes a frustoconical hood 58 formed adjacent extension 60 for causing actuation of switch arrangement 11 when plunger 34 is forced to the extended position.

Switch arrangement 11 further comprises a retainer 38 having a slot 62 which is provided to securely cover a portion of plunger 34 such that one of the opposing handles 57 extends outwardly through slot 62 and extension 60 is oriented to be insertable through aperture 26. A seal 66 is provided around aperture 26 for sealing around extension 60. As further shown, retainer 38 is secured to main housing 21 by a screw 51 inserted through an opening 68 formed through retainer 38.

Referring back to FIGS. 4a and 5, terminal assembly 41 is located proximate plunger 34 for transmitting a signal to the remote panel whenever plunger 34 is placed in the extended position. Terminal assembly 41 includes a switch element 47 and a contact arrangement 42 having a plurality of contacts 48 secured to main housing 21 which change state when the frustoconical section 58 of plunger 34 releases switch element 47 as plunger 34 is being forced to the extended position by spring 36. Conversely, when plunger 34 is placed in the raised position, the frustoconical section 58 engages and maintains switch element 47 in a depressed position which causes contacts 48 to change state again.

The present invention further contemplates a tamper switch 30 disposed inside chamber 28 adjacent retainer 38 which can be used to transmit a signal to the remote panel whenever cover 22 is opened. Tamper switch 30 comprises a spring-loaded actuator 33 biased by a spring 35 that is operatively connected to an actuator switch 31 which is activated by actuator 33. When cover 22 is in the closed position, tamper switch 30 is disabled, while is in the open position actuator 33 is biased into contact with actuator switch 31 by spring 35 causing actuator 33 to change state.

In assembly, a user secures valve switch 10 to a valve assembly 12 using the bracket arrangement 17 as described above. Valve switch 10 should be secured to valve assembly 12 such that lever 16 of valve assembly 12 may be positioned directly under aperture 26 of main housing 21 when rotated. Preferably, the user rotates the lever 16 in order to engage double beveled distal tip 61 such that plunger 34 is placed in the raised position and contact arrangement 42 changes state. In the alternative, the user may open cover 22 and manually place plunger 34 in the raised position. As the plunger 34 is placed in the raised position, the double beveled distal tip 61 becomes substantially flush with aperture 26. Once plunger 34 is so raised, the user rotates the lever 16 directly under beveled distal tip 61 such that plunger 34 is maintained in the raised position illustrated in FIG. 2 by lever 16. In this orientation, lever 16 may be in the closed, open or intermediate positions.

When maintenance is required, the user rotates lever 16 to place valve assembly 12 in the closed position and terminate fluid flow through conduit 18. As lever 16 is brought out of contact with the beveled distal tip 61 of plunger 34, the spring force applied by spring 36 forces plunger 34 into the extended position. As plunger 34 is forced to the extended position, frustoconical section 58 releases switch element 47 of terminal assembly 41 from its depressed position which causes contact arrangement 42 to change state. Once contact arrangement 42 changes state, a signal is transmitted through wires (not shown) to the remote panel signifying the closed position of valve assembly 12.

After maintenance is performed, the user preferably forces plunger 34 upward into the raised position by rotating the lever 16 directly under the double beveled distal tip 61 of plunger 34 such that plunger 34 is maintained in the raised position by lever 16. Alternatively, the user may manually raise plunger 34 as noted above which causes contact arrangement 42 to change state as lever 16 is restored to its original open position. In the alternative, valve switch 10 may be secured to valve assembly 12 such that the lever 16 can be rotated to the intermediate position and permit limited fluid flow through conduit 18.

Figure 6B:
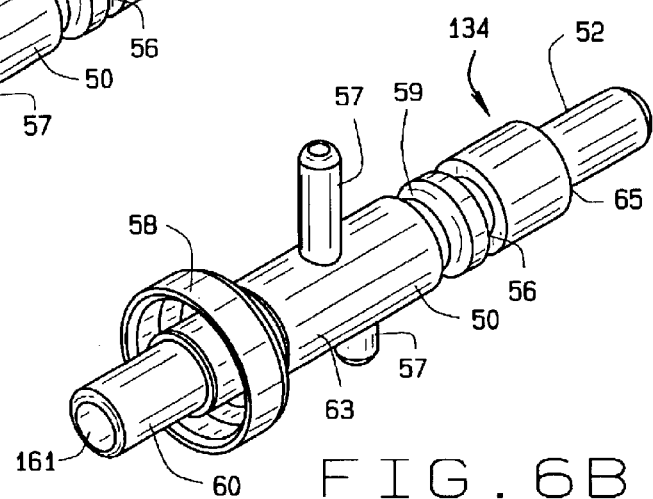
FIG. 6b is a perspective view of the alternate embodiment of the plunger showing a flat distal tip according to the present invention.

An alternative embodiment of the present invention is shown in FIG. 4b and 6b. Valve switch 110 is substantially similar to valve switch 10; however, plunger 134 defines a flat distal end 161, rather than a double beveled one. Further, a stop actuator 40 is provided which is selectively engageable with upper and lower grooves 56, 59 of plunger 134. As shall be explained in greater detail below, pivotable stop actuator 40 provides the means for locking and unlocking plunger 134 between its extended and raised positions.

In operation, when terminating fluid flow through conduit 18 for maintenance or testing the user pivots stop actuator 40 such that actuator 40 disengages from lower groove 59 causing plunger 134 to be biased to the extended position by spring 36. In the extended position the stop actuator 40 pivots back to engage upper groove 56 and lock plunger 134 in position. After maintenance or testing is performed, the user pivots stop actuator 40 such that actuator 40 disengages upper groove 56 and the user physically raises plunger 134 to the raised position shown in FIG. 4b. In the raised position, the user rotates lever 16 under distal tip 161 so that plunger 134 is maintained in that position.

Figure 6C:
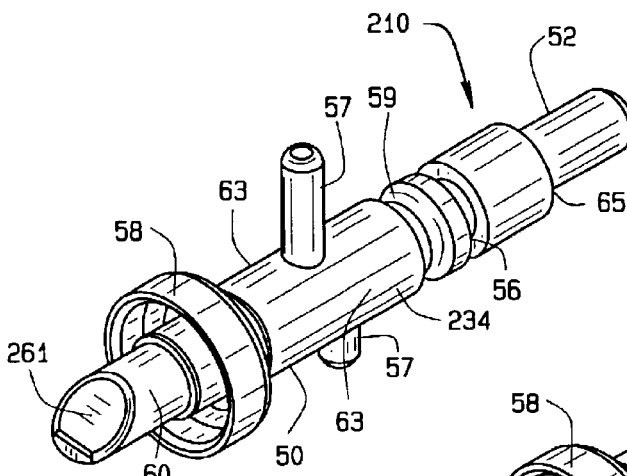
FIG. 6c is a perspective view of another alternative embodiment of the plunger showing a single beveled distal tip according to the present invention.

Another alternative embodiment of the present invention is shown in FIG. 6c. Valve switch 210 is also substantially similar to valve switch 10; however, plunger 234 defines a single beveled distal tip 261 rather than a double beveled one with the beveled portion facing the lever 16. The beveled configuration of tip 261 facilitates the plunger's 234 engagement with lever 16 when it is placed in the open position. In operation, plunger 234 operates in a substantially same manner as plunger 34.

Figure 6D:
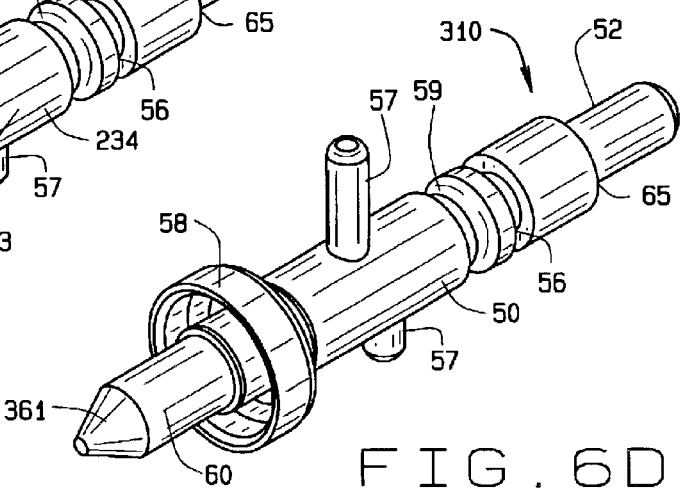
FIG. 6d is a perspective view of another alternative embodiment of the plunger showing a conical distal tip according to the present invention.

Yet another embodiment of the present invention is shown in FIG. 6d. In this embodiment, valve switch 310 is substantially similar to valve switch 10 with the exception that plunger 334 defines a conical distal tip 361. In operation, valve switch 310 operates similarly to plunger 34 of the preferred embodiment.

The present invention contemplates an alternative embodiment of the universal valve switch 110 showing a magnetic sensor assembly 120 for detecting the presence of lever 16 when it is rotated within a predetermined proximity of assembly 120, rather than the plunger and contact arrangements discussed above. As further shown, magnetic sensor assembly 120 comprises a magnet 122 secured to lever 16 using a conventional clamp 130 which is operatively associated with a sensor 124, such as a Hall Effect sensor or reed switch. The sensor 124 is secured to a pipe 132 using a bracket and pipeline arrangement 134 and is arranged relative to magnet 122 such that the rotation of lever 16 out of proximity from magnet 122 causes sensor 124 to sense the change in magnetic flux of magnet 122. When the change in magnetic flux is sensed, the magnetic sensor assembly 120 transmits a signal to a remote panel (not shown) signifying the non-contact position of lever 16 relative to assembly 120. Alternatively, the magnetic switch assembly 120 may detect the presence of lever 16 in any position: open, closed or intermediate. Further, the magnetic sensor assembly 120 includes a control module 190 for controlling the operation of assembly 120 and act as an interface with the remote panel when transmitting a signal.

Figure 7A:
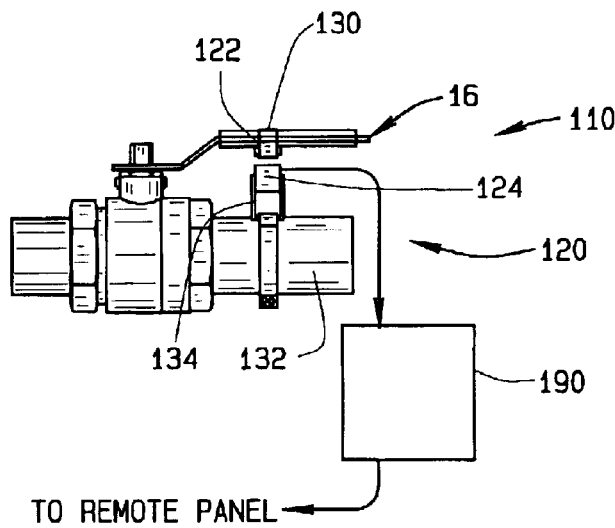
FIG. 7a is a side view of an alternative embodiment of the universal valve switch showing a magnetic sensor assembly according to the present invention.
Figure 7B:
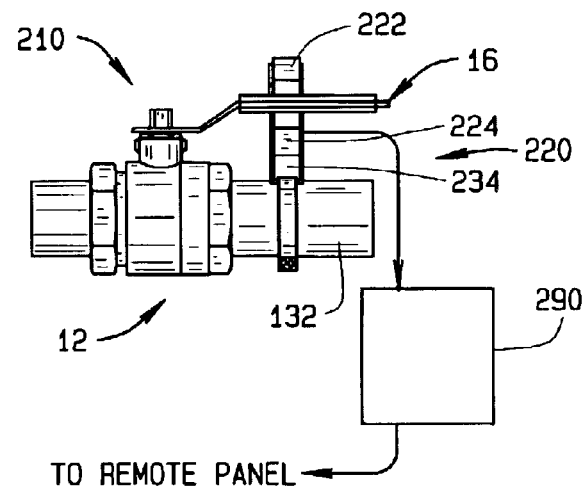
FIG. 7b is a side view of another alternative embodiment of the universal valve switch showing an optical sensor assembly according to the present invention.
Figure 7C:
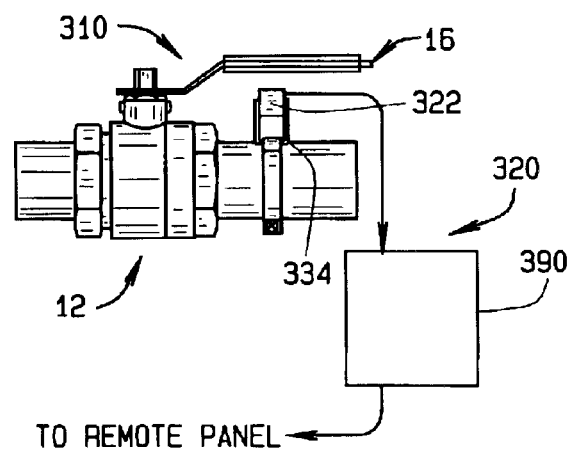
FIG. 7c is a side view of another alternative embodiment of the universal valve switch showing a proximity sensor assembly according to the present invention.

Referring to FIG. 7b, another alternative embodiment of the universal valve switch 210 is shown with an optical sensor assembly 220 for detecting the presence of lever 16, rather than a magnetic sensor assembly 120. As further shown, optical sensor assembly 220 comprises a photocell 222 operatively associated with a lightsource 224 which transmits a continuous beam of light 226 to photocell 222. To secure optical sensor assembly 220 to pipe 132, a conventional bracket and pipeclamp arrangement 234 is provided. When lever 16 is rotated out of contact with the beam of light 226, light 226 is allowed to stream continuously between lightsource 224 and photocell 222 and a signal is transmitted by control module 290 to the remote panel. However, when lever 16 is rotated between light source 224 and photocell 222, the beam of light is interrupted by the presence of lever 16 and control module 290 causes the signal to be terminated. The valve switch 210 may be oriented such that rotation of lever 16 to any position provides interrupted transmission of beam of light 226 to photocell 222.

Referring to 7c, another alternative embodiment of the universal valve switch 310 is shown with a proximity sensor assembly 320 for sensing the presence of lever 16 when it is rotated within proximity of assembly 320. Proximity sensor assembly 320 comprises a proximity sensor 322 which is secured to the pipe 132 by a conventional bracket and pipeclamp arrangement 334 such that lever 16 is sensed by the sensor 322 when it is rotated within proximity of sensor 322. The proximity sensor assembly 322 further includes a control module 390 for controlling the operation of assembly 322 and interfacing with the remote panel. Once lever 16 is rotated out of proximity with sensor 322, it transmits a signal to the remote panel, while rotating lever 16 within proximity of sensor 322 causes the signal be terminated.

Preferably, cover 22 is provided with an inner and outer labels 86 and 88 having proper identifying indicia, such as the make, model and manufacturer of the valve switch 10, as well as other relevant information. Cover 22 may also be provided with a threaded aperture 69 adapted to receive a screw 53 for securing cover 22 to main housing 21.

It should be understood from the foregoing that, while particular embodiments of the invention have been illustrated and described, various modifications can be made thereto without departing from the spirit and scope of the present invention. Therefore, it is not intended that the invention be limited by the specification; instead, the scope of the present invention is intended to be limited only by the appended claims.

I claim:

1. In combination, a valve switch and a valve assembly comprising:

a valve body, said valve body defining a conduit adapted for selective fluid flow communication between a source of water and a sprinkler system, said valve body including a valve member, said valve member being operatively connected to a rotatable lever for controlling fluid flow through said conduit; and a valve switch, said valve switch including a housing defining a chamber and having an aperture formed through said housing, said switch further including a plunger disposed in said chamber, said plunger being extendable through said aperture and operable between a raised position and an extended position, said plunger operatively associated with a contact arrangement for transmitting a signal when said plunger is placed in an extended position, wherein said lever is rotatable along a plane substantially similar to that of said plunger when said plunger is in said raised position to directly contact said plunger which maintains said plunger in the raised position and rotated out of contact with said plunger along said plane which forces said plunger into said extended position along a different plane.

2. The combination according to claim 1, wherein said plunger comprises a body, said body having an extension at one end defining a distal tip.

3. The combination according to claim 2, wherein said distal tip is double beveled, wherein said double-beveled distal tip facilitates engagement with said lever.

4. The combination according to claim 2, wherein said distal tip is flat.

5. The combination according to claim 2, wherein said distal tip is single beveled, wherein said single beveled distal tip facilitates engagement with said lever.

6. The combination according to claim 2, wherein said distal tip is conical, wherein said conical beveled distal tip facilitates engagement with said lever.

7. The combination according to claim 2, wherein said body of said plunger further includes at least one groove and at least one handle extending outwardly from said body.

8. The combination according to claim 7, wherein said switch further includes a stop actuator operatively associated with said plunger, said stop actuator being engageable with said at least one groove for locking said plunger in said extended position and disengageable with said at least one groove for releasing said plunger from said extended position.

9. The combination according to claim 1, wherein said plunger is operatively associated with a spring for biasing said plunger to said extended position.

10. The combination according to claim 1, wherein said housing further comprises a main housing and a cover rotatably engageable with said main housing.

11. The combination according to claim 1, wherein said said lever may be rotated to place said valve member in a closed position for preventing fluid flow through said conduit, an open position for permitting fluid flow therethrough, and an intermediate position for permitting limited fluid flow therethrough.

12. The combination according to claim 10, wherein said switch further comprises a tamper switch for transmitting a signal whenever said cover is opened.

13. The combination according to claim 12, wherein said tamper switch includes a spring-biased actuator switch which causes transmission of said signal whenever said cover is opened.

14. The combination according to claim 1, wherein said valve switch is attached to said valve assembly.

15. The combination according to claim 14, wherein a bracket arrangement is used to attach said valve switch to said valve assembly.

16. The combination according to claim 1, wherein said lever is rotated between said closed and open positions.

17. A valve switch in combination with a valve assembly comprising:
   a valve body defining a conduit adapted for selective fluid flow communication therethrough, said valve body including a valve member operatively connected to a rotatable lever for permitting or preventing fluid flow through said conduit; and
   a switch arrangement encased in a housing having an aperture, said switch arrangement including a plunger extendable through said aperture and operable between a raised position, wherein said plunger is in direct confact with said lever and an extended position,
   wherein when said lever is rotated out of direct contact with said plunger along a plane, said plunger is forced to said extended position along a different plane and said switch arrangement transmits a signal.

18. A valve switch comprising:
   a housing defining a chamber and an aperture in communication with said chamber;
   a switch arrangement disposed in said chamber, said switch arrangement including a plunger extendable through said aperture and operable between a raised position wherein said plunger is in direct contact with a lever rotatable along a plane, and an extended position when said lever is rotated along said plane, said plunger being operatively associated with a contact arrangement for transmitting a signal whenever said plunger is placed in said extended position along a different plane and out of contact with said lever.

19. A method of attaching a valve switch to a valve assembly, the valve switch assembly comprising the steps of:
   a) providing a valve switch comprising a housing defining a chamber and an aperture formed through said housing and in communication with said chamber, said valve switch including a plunger extendable through said aperture between a raised position along one plane and an extended position along a different plane, said valve switch further including a switch arrangement which transmits a signal when the said plunger is placed in said extended position;
   b) attaching said valve switch to the body of the valve assembly, said valve assembly comprising a conduit with a valve member disposed across said conduit and operatively connected to the rotatable lever;
   c) actuating said switch arrangement such that said plunger is placed in said raised position and in direct contact with said plunger; and
   d) rotating said lever of the valve assembly along said one plane until said lever is out of direct contact with said plunger and places said plunger in the extended position along said different plane.

20. The method according to claim 19, wherein said step of attaching further includes using a bracket arrangement to attach said valve switch to said valve assembly.

21. The method according to claim 19, wherein when said lever is brought out of direct contact with said plunger, said valve switch transmits a signal.

* * * * *